United States Patent [19]

Cater

[11] Patent Number: 5,348,189

[45] Date of Patent: Sep. 20, 1994

[54] AIR PURGE PUMP DISPENSER

[75] Inventor: Miro S. Cater, Newtown, Conn.

[73] Assignee: Bespak plc, Norfolk, United Kingdom

[21] Appl. No.: 25,407

[22] Filed: Feb. 26, 1993

Related U.S. Application Data

[63] Continuation-in-part of Ser. No. 805,659, Dec. 12, 1991, abandoned, which is a continuation-in-part of Ser. No. 682,936, Apr. 10, 1991, Pat. No. 5,163,588.

[51] Int. Cl.$^5$ ............................................. G01F 11/00
[52] U.S. Cl. .................................... 222/1; 222/321; 222/341; 222/385
[58] Field of Search ................ 222/1, 321, 340, 341, 222/383, 385; 239/333

[56] References Cited

U.S. PATENT DOCUMENTS

| | | | |
|---|---|---|---|
| 4,057,176 | 11/1977 | Horvath | 222/193 |
| 4,089,442 | 5/1978 | Hafele et al. | 222/321 |
| 4,122,982 | 10/1978 | Giuffredi | 222/321 |
| 4,230,242 | 10/1980 | Meshberg | 222/321 |
| 4,274,560 | 6/1981 | Cater | 222/321 |
| 4,735,347 | 4/1988 | Shultz et al. | 222/321 |
| 4,776,498 | 10/1988 | Maerte et al. | 222/321 |
| 4,830,284 | 5/1989 | Maerte | 239/333 |
| 5,025,958 | 6/1991 | Montaner et al. | 222/385 X |
| 5,092,495 | 3/1992 | Andre | 222/385 X |
| 5,100,029 | 3/1992 | Meshberg | 222/148 |
| 5,110,052 | 5/1992 | Graf et al. | 239/333 |
| 5,147,073 | 9/1992 | Cater | 222/385 X |
| 5,147,087 | 9/1992 | Fuchs | 239/333 |
| 5,163,588 | 11/1992 | Cater et al. | 222/321 |

FOREIGN PATENT DOCUMENTS

| | | |
|---|---|---|
| 0451615 | 10/1992 | European Pat. Off. . |
| 2825428 | 12/1979 | Fed. Rep. of Germany . |
| 8702225 | 4/1989 | Netherlands . |

*Primary Examiner*—Andres Kashnikow
*Assistant Examiner*—Joseph A. Kaufman
*Attorney, Agent, or Firm*—Beveridge, DeGrandi, Weilacher & Young

[57] ABSTRACT

Pump apparatus for delivering water based formulations as an aerosol spray provides for quantities of liquid and air to be pressurized in separate chambers by pump action. Liquid is dispensed through an orifice via a dispensing channel which in one embodiment is purged during a terminal part of the actuating stroke by the release of air through the dispensing channel. In the second embodiment air and liquid are mixed during the actuating stroke so as to be dispensed together and during a return stroke air is sucked through the dispensing channel to remove residual liquid. The air purging action prevents the build-up of deposits in the dispensing channel and orifice.

28 Claims, 10 Drawing Sheets

PRESSURE DIAGRAM

SUMMATION OF LIQUID PISTON FORCES

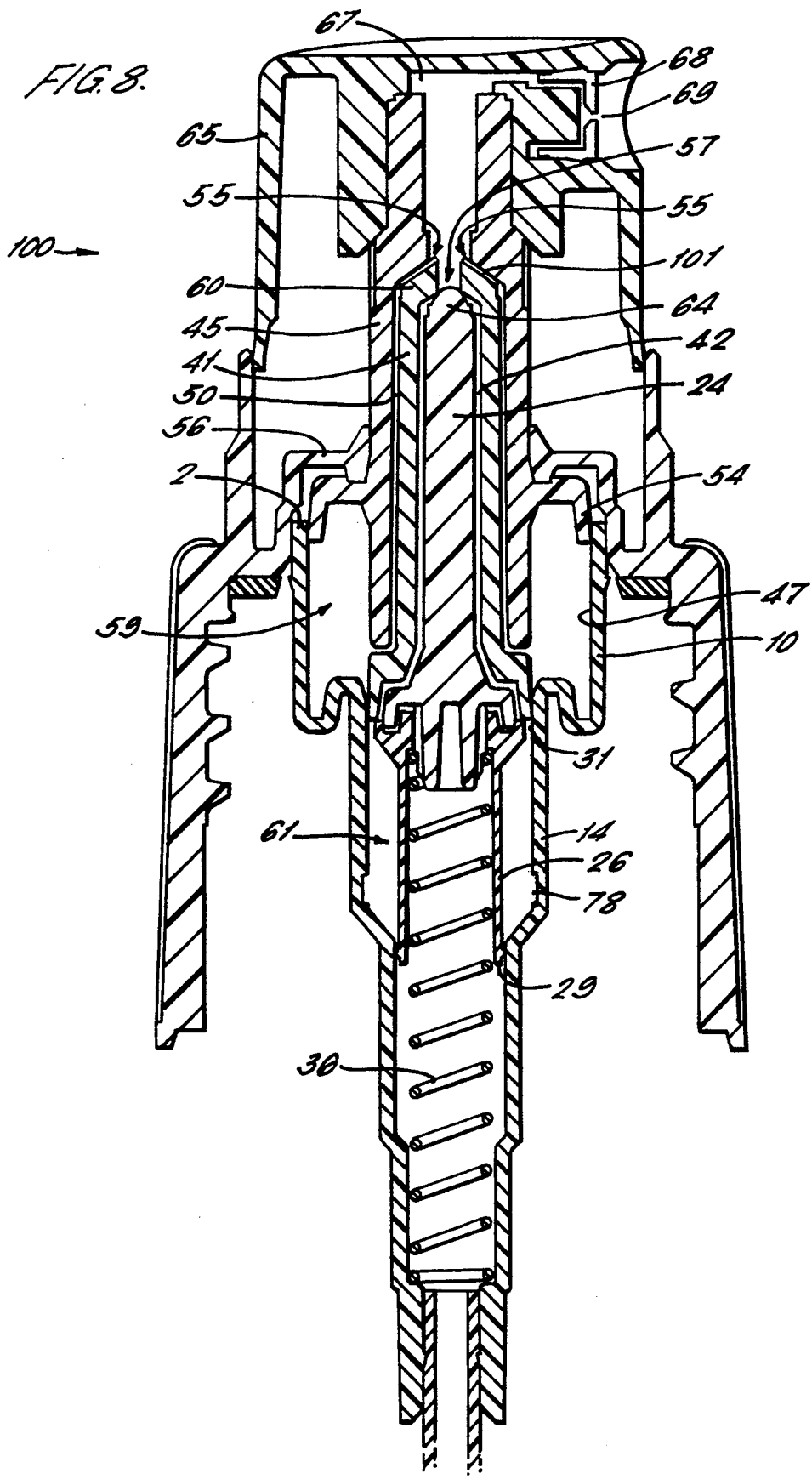

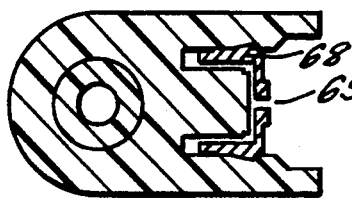
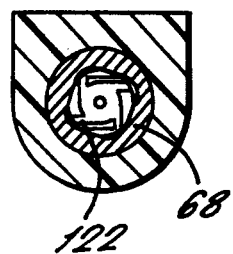
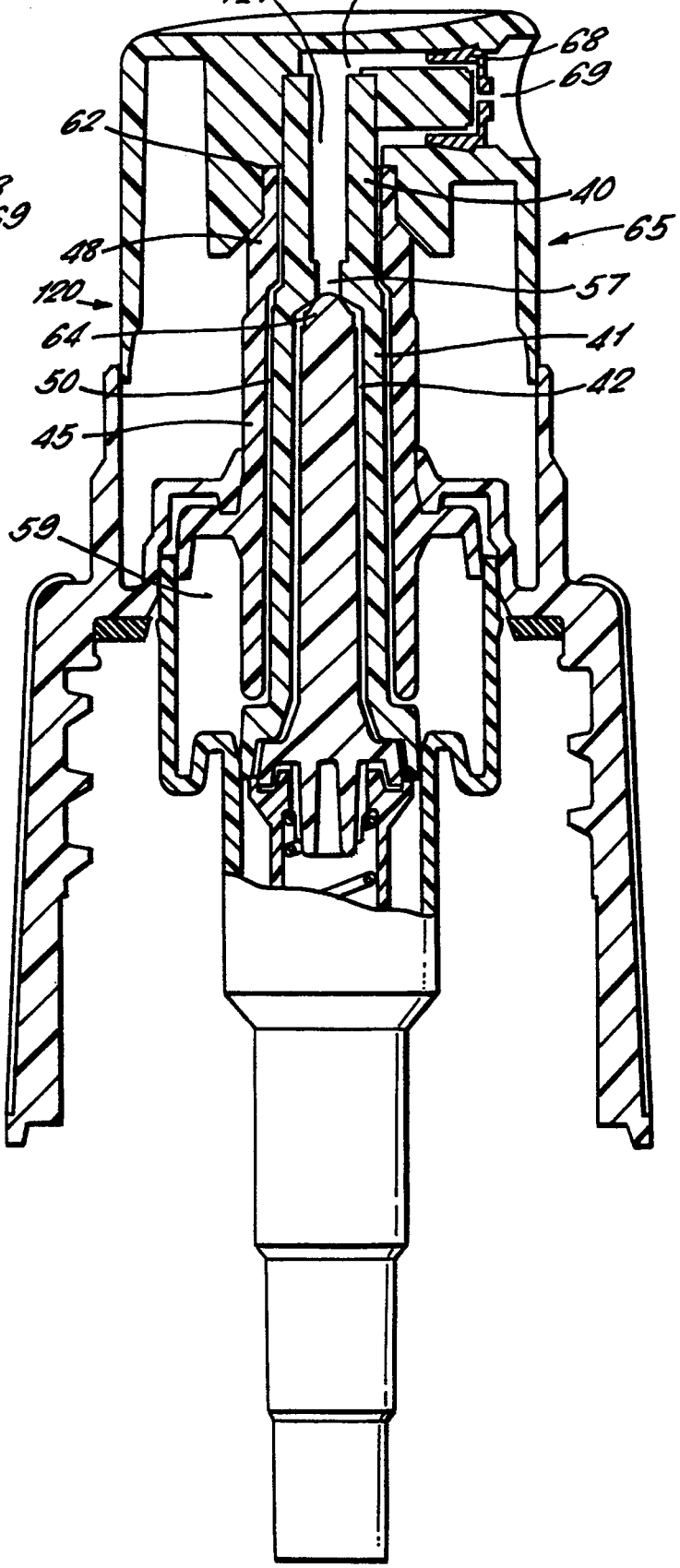

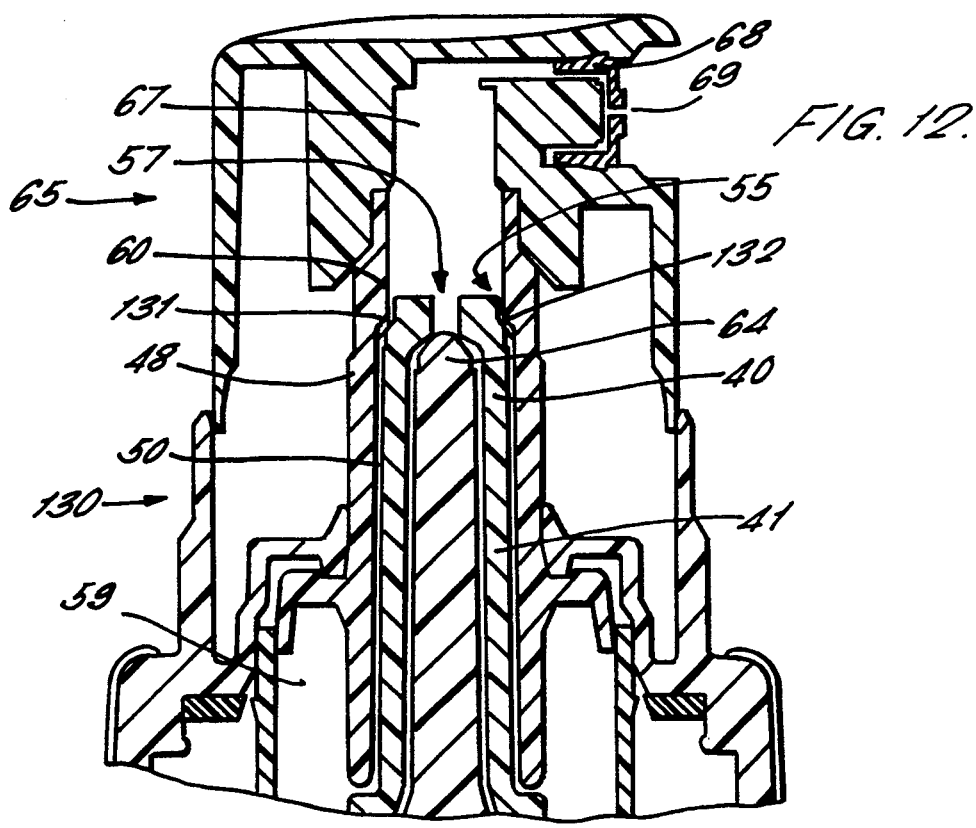
FIG. 12.
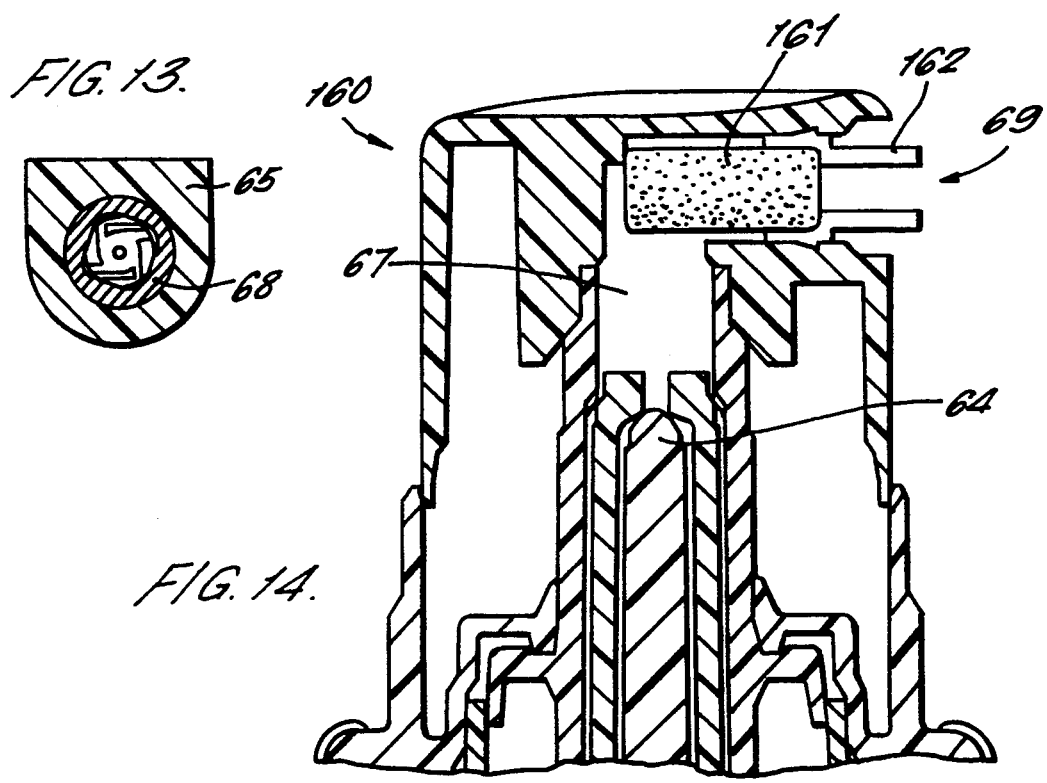
FIG. 13.
FIG. 14.

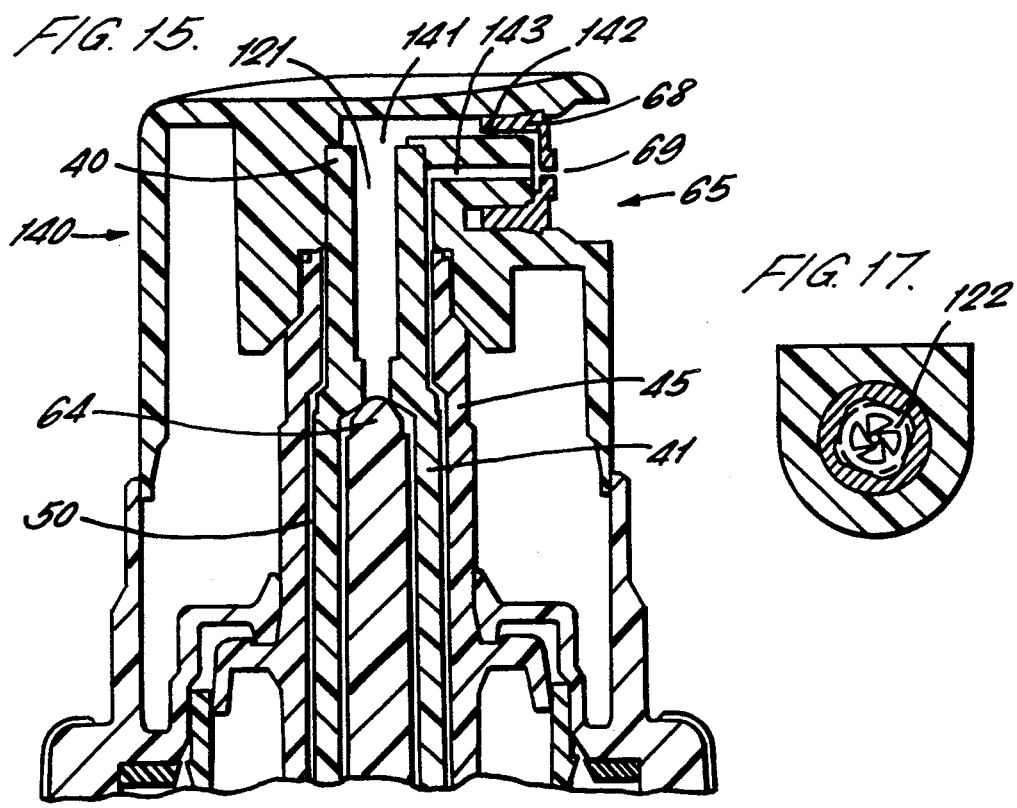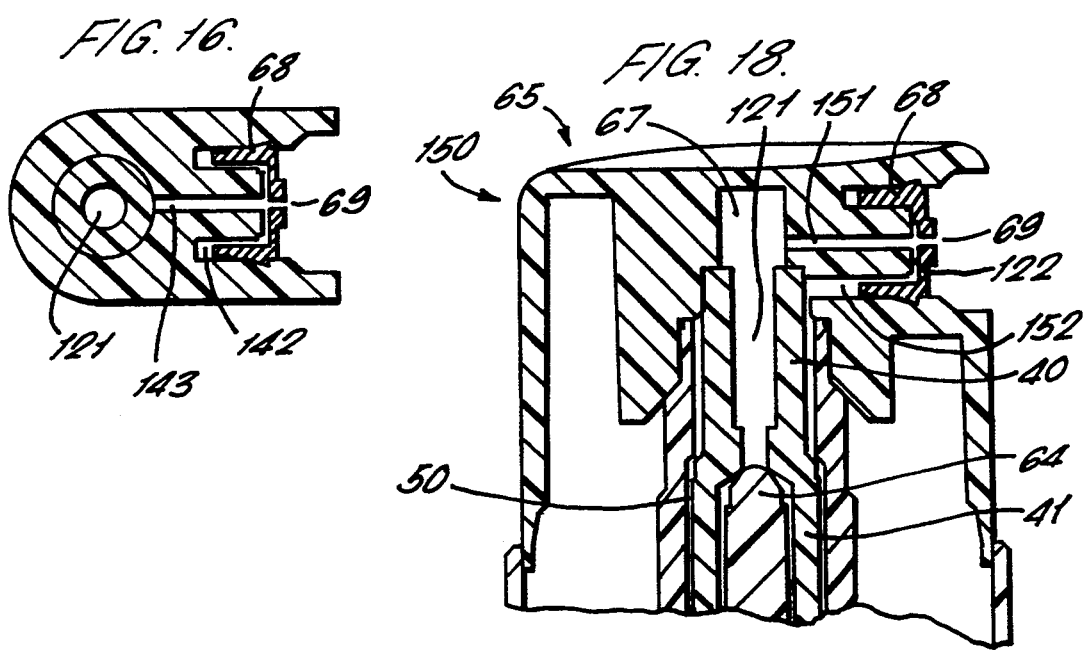

AIR PURGE PUMP DISPENSER

CROSS REFERENCE TO COPENDING APPLICATIONS

The present application is a continuation-in-part of a copending application entitled "Air purge pump dispenser" Ser. No. 07/805,659 filed Dec. 12th 1991 now abandoned which is in turn a continuation-in-part of copending application entitled "Atomizing Pump Dispenser for Water Based formulation", Ser. No. 07/682,936, filed Apr. 10th 1991 now U.S. Pat. No. 5,163,588. The contents of each of these copending applications are incorporated by reference into the present application.

BACKGROUND OF THE INVENTION

It is well known in the art that aerosol packages deliver optimum performance for hair sprays and other personal care formulations. However, because of environmental considerations, use of such packages will be minimized in the near future. Pump dispensers are acceptable alternatives to aerosols, providing that alcohol is used as a solvent of these formulations to minimize the tendency to clog. Nevertheless, alcohol is a volatile organic compound (VOC) and such compounds also create environmental damage. Future VOC standards will limit the use of VOCs.

The obvious substitute for VOCs is water. Nevertheless, water based formulations cause known types of pump dispensers to clog, particularly when the formulations contain high percentages of solids.

The copending application discloses a new and improved type of atomizing pump dispenser which is capable of properly delivering water based formulations without clogging even when such formulations contain high percentages of solids. The various components of this dispenser whether moved together or apart or maintained in continuous sliding contact during operation are subjected to a self cleaning or wiping action which prevents buildup onto these parts of solids in the formulation. In some applications, however, the discharge orifice can become obstructed, causing the dispenser to fail.

The present invention is directed toward a new and different pump dispenser, termed an air purge pump dispenser, which delivers water based products without clogging by introducing air into the discharge spray at some point during actuation, followed by an air purging action which removes the remnants of the product from the spray path before such remnants come in contact with the oxygen in the air, solidify and obstruct the discharge orifice.

SUMMARY OF THE INVENTION

Accordingly, it is an object of the present invention to provide a new and improved pump dispenser which is capable of delivering water based products and which provides a purging action which removes the remnants of the product from the spray path before such remnants come in contact with the oxygen in the air, solidify and obstruct the discharge orifice.

These and other objects and advantages of the invention will either be explained or will become apparent hereinafter.

According to the present invention there is disclosed a dispensing apparatus for dispensing liquid by pump action as an atomized spray, the apparatus comprising a body defining a first cylinder within which a first piston is reciprocatably located to define a first chamber of variable volume and which in use contains a quantity of liquid to be dispensed;

the body further defining a second cylinder within which a second piston is reciprocatably located to define a second chamber of variable volume which in use contains a quantity of air;

actuating means operable during an actuating stroke to move the respective pistons in tandem in a direction such that the volumes of the respective chambers are reduced and during a return stroke to return the pistons to respective rest positions in which the respective chambers are expanded;

liquid valve means operable to admit liquid to the first chamber during at least part of the return stroke and release pressurised liquid therefrom during at least part of the actuating stroke, the liquid valve means comprising a liquid exit port for the release of liquid from the first chamber;

channel means defining a discharge orifice and a dispensing channel communicating between the liquid exit port and the discharge orifice, and air conduit means defining an air conduit communicating between the second chamber and the dispensing channel during at least part of the actuating stroke whereby in use air pressurised in the second chamber is conducted via the channel through the discharge orifice.

In a preferred embodiment of the invention, the second vertical cylinder has open upper and lower ends, the inner surface of the second cylinder adjacent the upper end having an air conduit. The air conduit can be a horizontally extending groove disposed in the inner surface of the second cylinder.

The first vertical cylinder has a diameter smaller than that of the second cylinder and has open upper and lower ends, the lower end of the second cylinder merging with the upper end of the first cylinder. A third vertical cylinder has a diameter smaller than that of the first cylinder and having an open upper end and a lower end which is closed except for a central opening, the lower end of the first cylinder merging with the upper end of the third cylinder.

An elongated stem has an upper portion which extends upwardly through the upper end of the second cylinder and has a lower portion which extends downwardly through the first and second cylinders with a lower end which is peripherally engageable with the inner surface of the third cylinder.

A first piston has an upper hollow extension with an open upper end, the upper portion of the stem extending within and being spaced from the upper extension of the first piston thus defining a liquid conduit therebetween. The first piston has a lower extension extending downwardly through the second cylinder into the first cylinder with a lower end which is peripherally engageable with the inner surface of the first cylinder.

A second piston has a hollow upper section, the upper extension of the first piston extending within and being spaced from the upper section of the second piston, thus defining an air conduit therebetween. The second piston has a lower section with an outward extension which is peripherally engageable with the inner wall of the second cylinder.

A collar covering the upper end of the second cylinder has a central opening through which the upper portion of the stem, the upper extension of the first piston and the upper section of the second piston extend, the collar having an integral vertical wall secured to the outer periphery of the upper end of the second cylinder and extending downwardly in such manner that an air entry channel is formed therebetween. The air entry channel and the groove define an air entry port which is open when the outer periphery of the lower end of the lower section is aligned with said groove and which is closed when this outer periphery engages the inner wall of the second cylinder, the air entry port when open interconnecting the air conduit with the air channel.

Each of the first and second pistons are movable between raised and lowered positions, the first piston and the second piston being engageable with and disengageable from each other, the first and second pistons when disengaged defining an open air exit port and when engaged defining a closed air exit port.

The stem is movable between raised and lowered positions, the stem and first piston being engageable with and disengageable from each other, the stem and first piston when disengaged defining an open liquid exit port and when engaged defining a closed liquid exit port.

The upper and lower portions of the stem are cooperable in such manner that the upper end of the lower portion and the lower end of the upper portion can be sealed together to define a closed liquid entry port and can be moved away from each other to define a liquid channel therebetween forming an open liquid entry port.

The lower portion of the stem can be hollow and open at its bottom end. Biasing means extending within the lower portion and the third cylinder can normally bias the liquid entry port into closed position.

In use, the apparatus is connected to a suitable container filled with a product to be dispensed. A dip tube is connected to the central opening of the third cylinder and extends into the formulation. The collar, second piston and the second cylinder define the second chamber, referred to below as an air chamber. The first and second pistons, the stem and the first cylinder define a first chamber, referred to below as a liquid chamber, which communicates with the liquid conduit.

As will be explained in more detail below, in rest position, air can flow freely into the air chamber, the liquid chamber is filled with liquid, the liquid conduit is also filled with liquid and the air exit and the liquid exit ports are closed. When the pump is actuated by a downstroke, the pistons and stem travel downward and the air chamber and the liquid chamber are both sealed off. The pressures in both chambers begin to rise.

However, the liquid is incompressible and the pressure in the liquid chamber changes immediately. When this pressure exceeds the bias force on the stem, the lower portion of the stem moves downward with respect to the first piston, the liquid exit port is opened and the pump dispenses liquid at a predetermined pressure.

Since the air is compressible, the pressure in the air chamber rises inversely with the reduction in the volume of the air chamber caused by the downward movement of the second piston. When the pressure in the air chamber exceeds the pressure in the liquid chamber, the first piston moves downward with respect to the second piston, the air exit port opens and air is introduced into the liquid stream. At this point, the liquid entry port is opened and the pressure in the liquid chamber drops, causing the liquid exit port to close. The air exit port remains open and the component in the stream continues to be discharged, so that the dispenser sprays air and purges the external channels of remaining liquid.

The liquid pressure can be relieved at any point during the downstroke by locating a recess on the inner wall of the third cylinder, disposed in any position between the upper and lower ends of the third cylinder which is selected to define the point at which the liquid pressure is to be relieved. When the lower end of the lower portion of the stem is aligned with this recess, the seal between the third cylinder and the lower portion of the stem is broken. The forces acting on the liquid piston reverse instantly, and the liquid exit port is closed and the air exit port is opened.

At the bottom of the downstroke, ambient air is allowed to enter the second cylinder via the passages between the collar and the second piston and from there into the head space of the package. Throughout the return stroke, the liquid chamber is refilled with fluid due to the check valving interaction of the upper and lower portions of the stem. The air is allowed to enter into the air chamber at the top of the return stroke.

In an alternative embodiment the air conduit means comprises an air conduit which is continuously in communication with the dispensing channel via a continuously open air exit port. In this embodiment a separate air entry port need not be provided since the air chamber is refilled during the return stroke via the open air exit port.

An advantage of this arrangement is that any residual liquid in the vicinity of the air exit port is drawn by suction into the air chamber. This liquid is collected and will be at least partially discharged via the air exit port during the next actuation of the apparatus.

Preferably the air exit port is defined between an annular upper end of the first piston and an internal wall of the second piston, the liquid exit port being defined between the annular upper end portion of the first piston and an upper end portion of the valve means whereby the air exit port is located immediately adjacent the liquid exit port.

Since the air exit port in this arrangement remains permanently open, there is a simultaneous flow of air and liquid through the channel means during the actuating stroke. Mixing of air and liquid during dispensing can be beneficial to the formation of an aerosol spray when used with certain products.

Conveniently the channel means defines a mixing chamber located downstream of both the air exit port and the liquid exit port, the mixing chamber being upstream of the discharge orifice whereby air and liquid are mixed prior to discharge.

Alternatively it may be desirable when dispensing certain products to provide a channel means which comprises an air channel and a liquid channel formed separately from the air channel, the air channel and the liquid channel extending from their respective air and liquid exit ports to a location immediately adjacent the discharge orifice at which they are joined so as to provide mixing of air and liquid immediately prior to discharge.

In such an arrangement the terminal portion of the liquid channel may extend linearly in line with the discharge orifice.

In accordance with a further aspect of the present invention there is disclosed a method of dispensing a liquid by pump action wherein the valve means is closed during a terminal part of the actuating stroke and including the step of releasing air from the second chamber during the terminal part of the actuating stroke to thereby purge the dispensing channel of liquid.

By such a method a jet or spray of liquid is dispensed and is immediately followed by a flow of air through the dispensing channel which purges the dispensing channel of any residual liquid. The build up of residual deposits which might otherwise clog the dispensing channel is thereby avoided.

The method may alternatively include the step of releading air from the second chamber throughout the actuating stroke and allowing air and liquid to mix in the mixing chamber prior to being dispensed from the discharge orifice.

This may be desirable when dispensing certain products and will have an effect on the quality of aerosol spray dispensed from an atomising nozzle defined at the discharge orifice.

The method may include the step of allowing air to enter the second chamber via the dispensing channel during a return stroke of the apparatus in which the volume of the first and second chambers are increased such that residual liquid in the dispensing channel is sucked into the second chamber.

The terms upper and lower are used throughout the specification to denote the relative position of parts of the apparatus when the apparatus as a whole is oriented in the manner shown in the accompanying drawings. It is to be understood that in some applications the process may be operated in other orientations in which the parts denoted as being upper or lower with reference to the orientation of the drawings need not necessarily be uppermost or lowermost in use respectively.

BRIEF DESCRIPTION OF THE DRAWINGS

FIG. 1A is an enlarged detail view of a portion of the structure shown in FIG. 1;

FIG. 8 is a sectioned elevation of an alternative apparatus in accordance with the present invention in which an air exit port is permanently open;

FIG. 9 is a sectioned elevation of a further alternative apparatus in which the upper end of the first piston extends into the actuator;

FIG. 10 is a detail of the actuator of FIG. 9 in plan view;

FIG. 11 is a detail of the actuator of FIGS. 9 and 10 showing swirl inducing grooves;

FIG. 12 is a sectioned elevation of a further alternative apparatus in which an upper section of the second piston is engaged in the actuator;

FIG. 13 is a detail of the actuator of FIG. 12;

FIG. 14 is a detail of a further alternative actuator for use with the apparatus of FIG. 12;

FIG. 15 is a sectioned elevation of a further alternative apparatus in which mixing of air and liquid occurs locally at the dispensing orifice;

FIG. 16 is a detail of the actuator of FIG. 15;

FIG. 17 is a further detail of the actuator of FIGS. 15 and 16; and

FIG. 18 is a sectioned elevation of a further alternative actuator for use with the apparatus of FIG. 15.

DETAILED DESCRIPTION OF PREFERRED EMBODIMENTS

Figure 1:
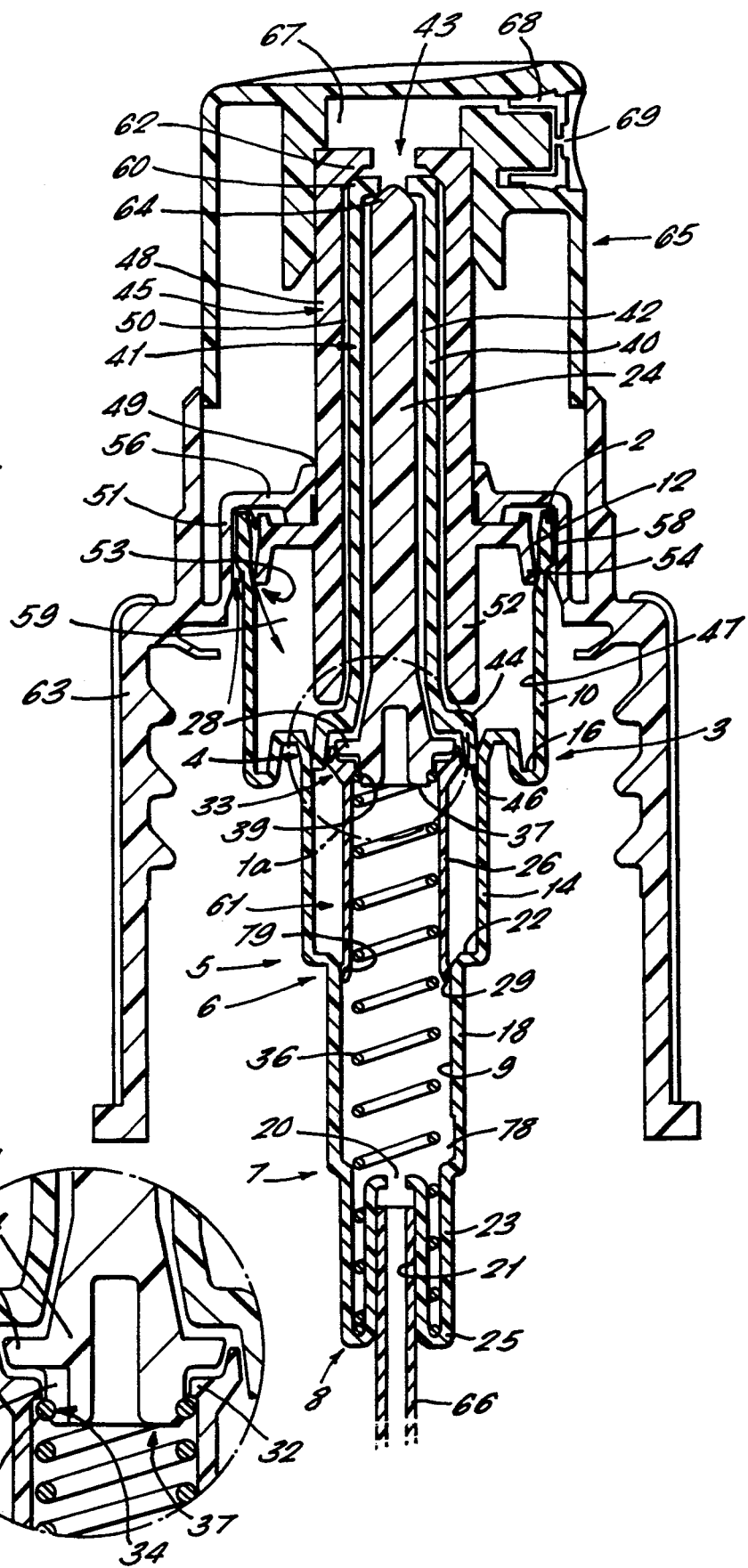
FIG. 1 is a vertical cross-section of a preferred embodiment of the invention shown in rest position with the air intake path shown by an arrow.

Referring now to FIGS. 1 to 6, an air purge pump dispenser 1 comprises a body 71 which is generally tubular and of stepped diameter to define first, second and third cylinders 14, 10 and 18 respectively. The second cylinder 10 is uppermost and has open upper and lower ends 2 and 3, and an inner surface 12 which is recessed adjacent the upper end to provide a horizontal groove 12 constituting an air conduit as will be further explained below.

The first vertical cylinder 14 depends from the second cylinder 10 having a diameter smaller than that of the second cylinder 10 and has open upper and lower ends 4 and 5, the lower end 3 of the second cylinder merging with the upper end of the first cylinder at an inner ledge 16. A third vertical cylinder 18 depends from the first cylinder 14 having a diameter smaller than that of the first cylinder 14, and has an open upper end 6 and a lower end 7 which is closed except for a central opening 20. The third cylinder 18 has a re-entrant inner wall 21 extending downwardly from the central opening 20, the inner wall having a lower end 8 joined to a lower extension 23 of the third cylinder 18. Inner wall 21 and extension 23 are joined at a circular inner groove 25 and the space within extension 23 forms an annular region which supports a spring 36. The lower end 5 of the first cylinder 14 merges with the upper end 6 of the third cylinder 18 at an inner ledge 22.

The third cylinder 18 has an inner surface 9 which is provided with a recess 78 adjacent but above the lower end 7.

A two part elongated stem 24,26 has an upper portion 24 which extends upwardly through the upper end 2 of the second cylinder 10 and has a separately formed lower portion 26 which extends downwardly through the first and second cylinders 14 and 10, the lower portion 26 having a lower end 29 which is maintained in peripherally sealing engagement with the inner surface 9 of the third cylinder 18.

Figure 5:
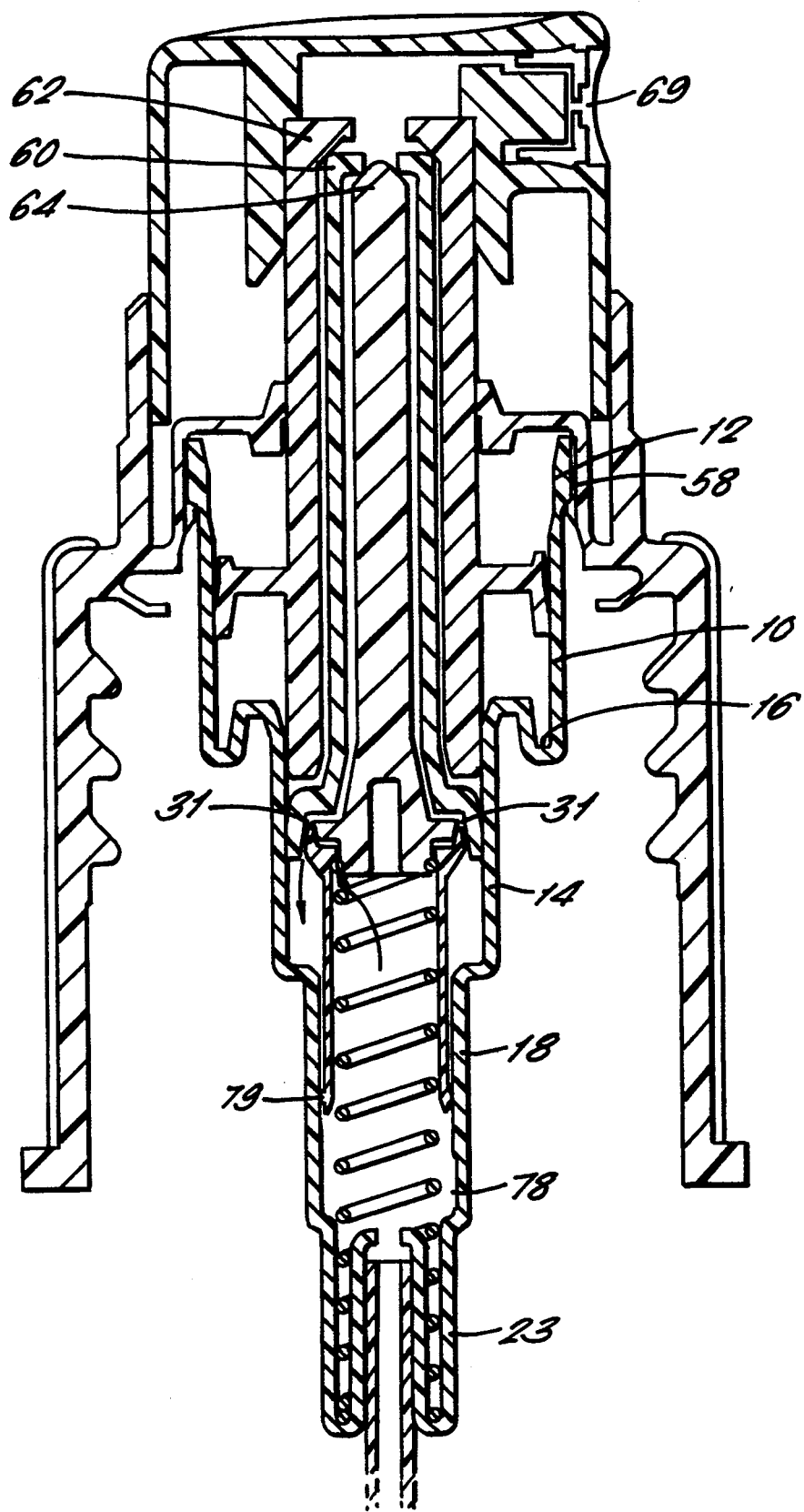
FIG. 5 is a view similar to FIG. 1 at the position of the upstroke at which the liquid chamber begins to refill, with the refill flow illustrated by an arrow.

In the rest position of the dispenser 1 as shown in FIG. 1, the lower portion 26 of the stem is held in sealing engagement with the upper portion 24 by action of spring 36. The lower portion 26 is movable in use out of contact with the upper portion 24, as for example as shown in FIGS. 1a and 5 to define a liquid entry port 31. Sealing engagement is effected between a radially outwardly projecting ring 28 formed integrally with the upper portion 24 and an outwardly and upwardly flaring surface 30 provided on the upper end 33 of the lower portion 26 as shown in FIG. 1a so that surface 30 peripherally engages ring 28 in sealing engagement when the liquid entry port 31 is closed and is spaced below ring 28 when the port is open. A ring 32 formed integrally with the lower portion 26 projects radially inwardly at the upper end 33 adjacent the surface 30. The upper portion 26 has a lower end 37 in which an annular recess 34 is peripherally formed and which receives an uppermost turn 39 of spring 36. This turn 39 is disposed below ring 32 and has a larger diameter.

The lower end 37 of the upper portion 24 projects through the ring 32 to an extent which is limited by engagement with the uppermost turn 39 in the recess 34 so that the upper and lower portions 24 and 26 of the stem are always retained in sliding engagement whether the liquid entry port is open or closed. The recess 34 has spaced vertical conduits 38 for conducting fluid into and out of the liquid entry port 31 when it is open.

Figure 4:
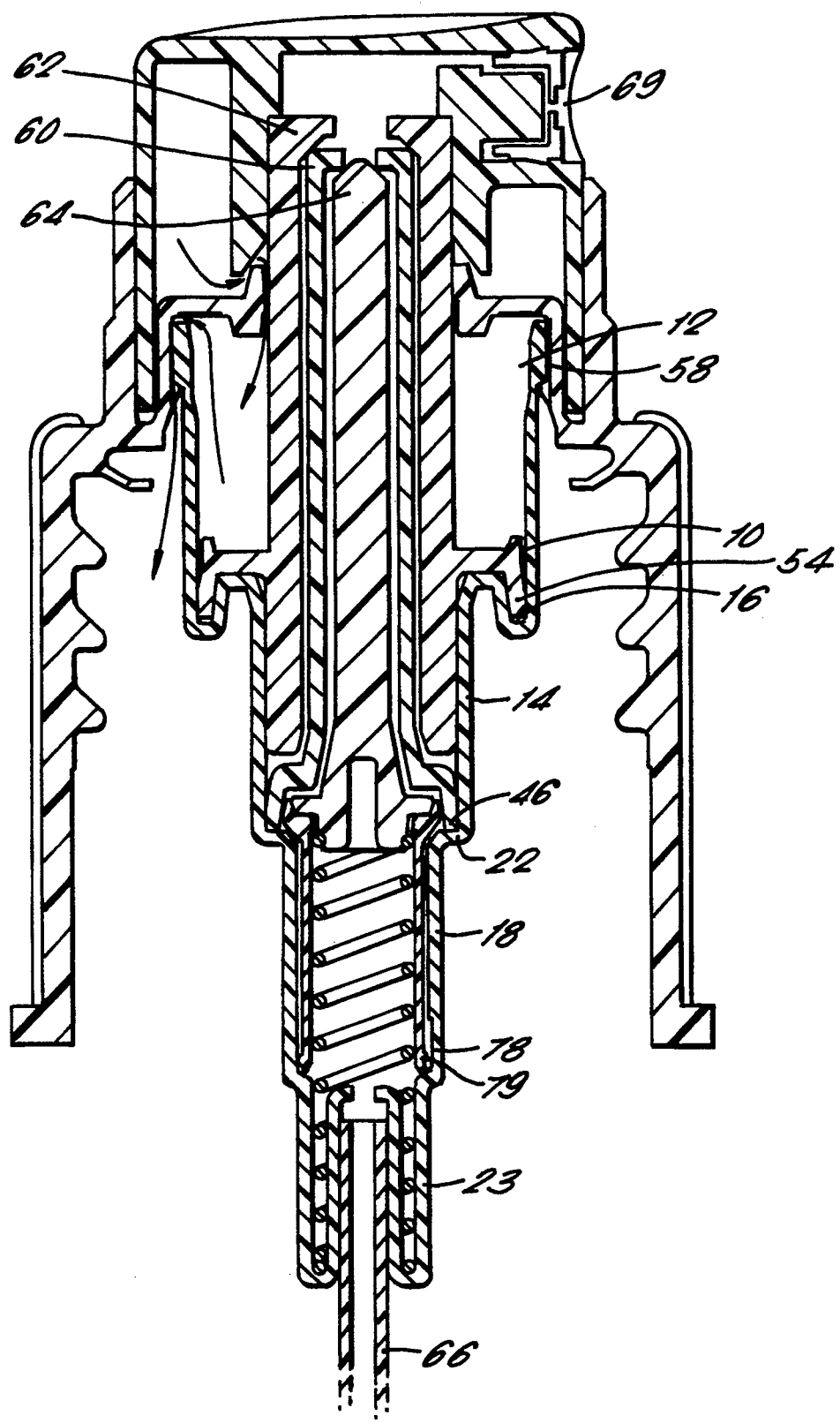
FIG. 4 is a view similar to FIG. 1 at the bottom of the downstroke, with the return air flow illustrated by an arrow.

A first piston 41 has a hollow upper extension 40 with an open upper end 43, the upper portion 24 of the stem extending within and being spaced from the upper extension thus defining a liquid conduit 42 therebetween. The open upper end 43 of the first piston 41 defines an aperture which is much smaller in cross-section than the size of ring 28 so that excess pressure of liquid in liquid conduit 42 will produce a net downward force on the upper portion 24 of the stem. The first piston 41 has a lower extension 44 extending downwardly through the second cylinder 10 into the first cylinder 14 with a radially enlarged lower end 46 which is maintained in peripherally sealing engagement with the inner surface of the first cylinder. When the first piston 41 is in its fully lowered position as shown in FIG. 4, the lower end 46 engages the ledge 22 thereby limiting downward travel of the first piston.

A second piston 45 has a hollow upper section 48, the upper extension 40 of the first piston 41 extending within and being spaced from the upper section, thus defining an air conduit 50 therebetween. The second piston 45 has a lower section 52 with an annular radially outward extension 54 which is peripherally engageable with an inner wall 47 of the second cylinder 10. When the second piston 45 is in its fully lowered position as shown in FIG. 4, extension 54 engages ledge 16 thereby limiting downward travel of the second piston.

Figure 2:
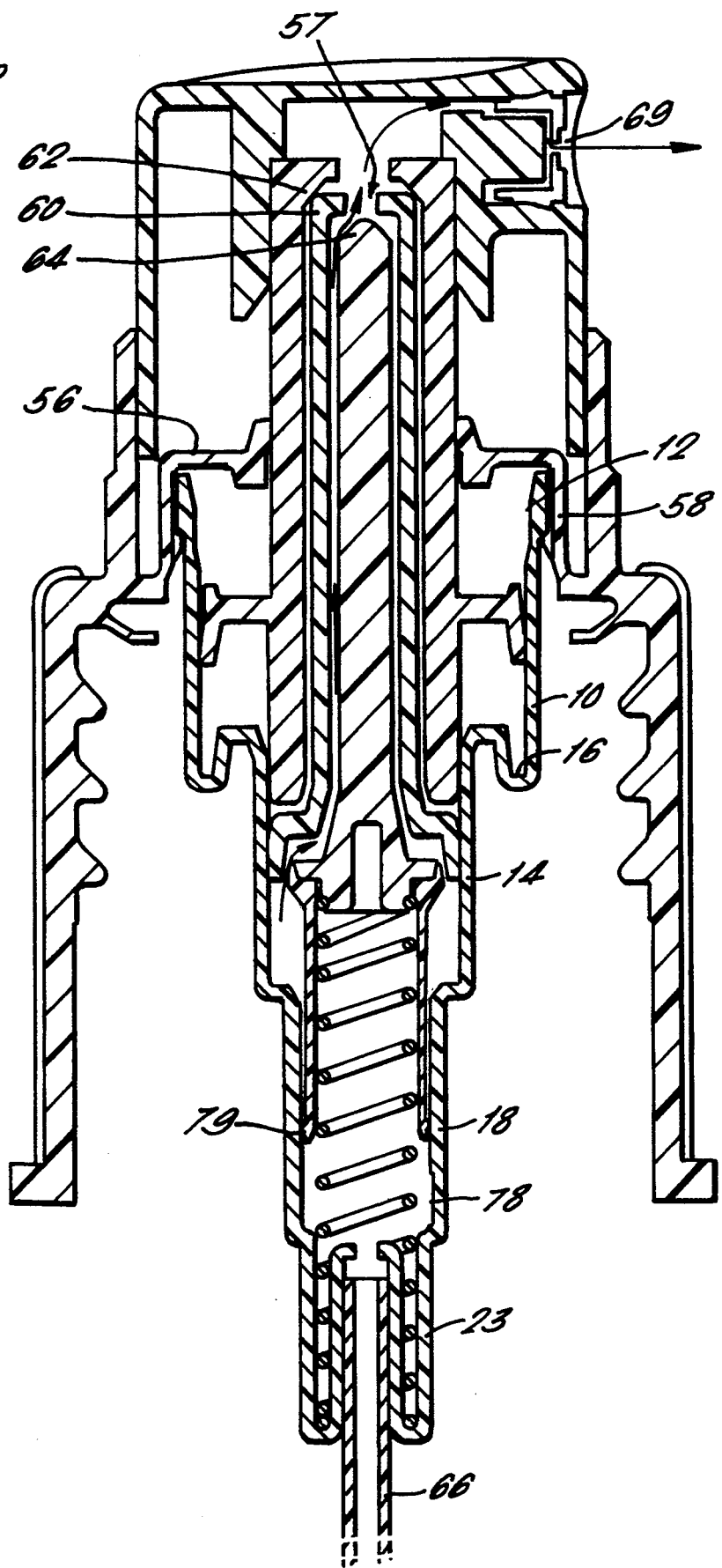
FIG. 2 is a view similar to FIG. 1 at the beginning of a downstroke, illustrating the liquid discharge by an arrow.
Figure 3:
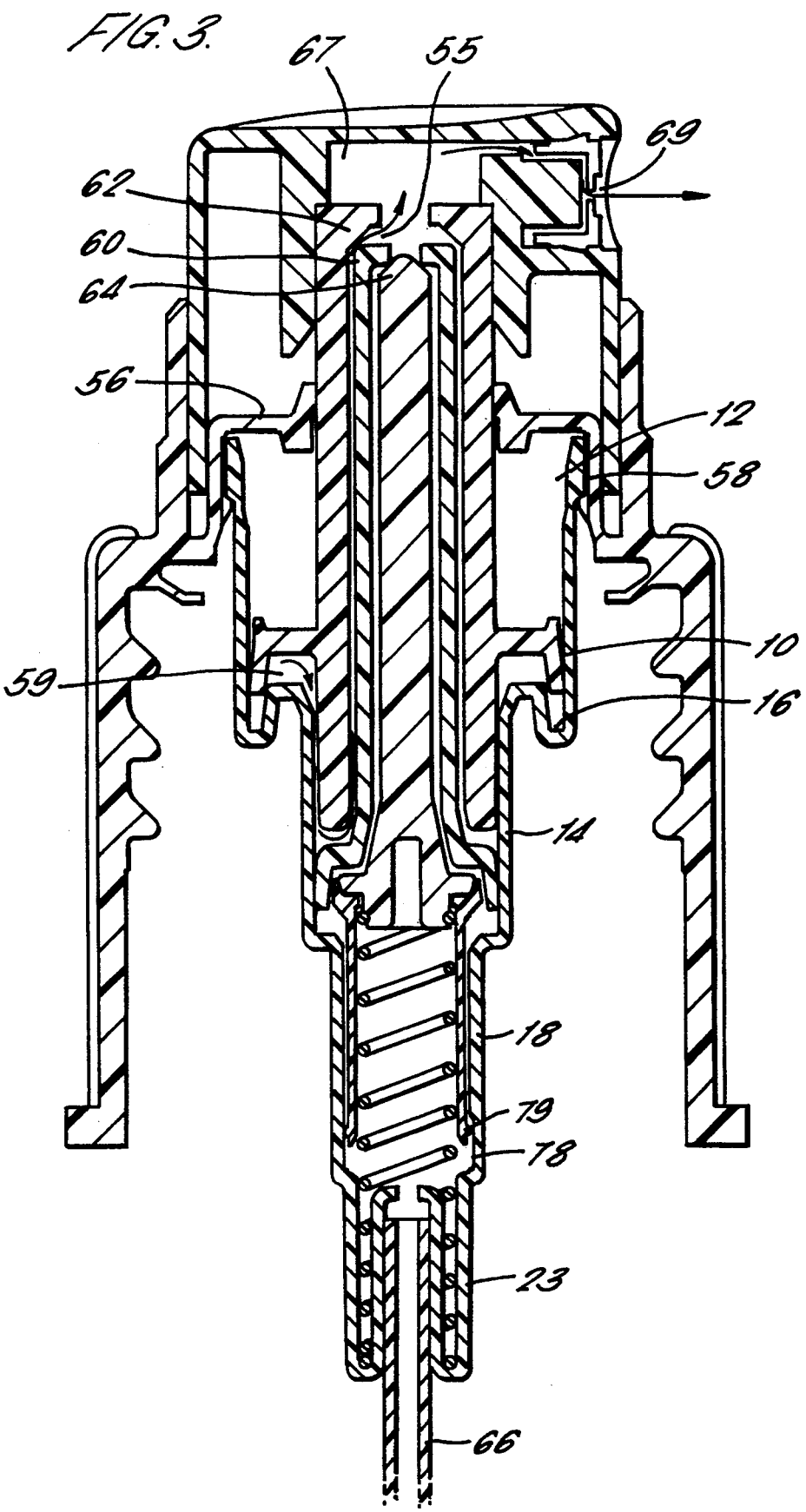
FIG. 3 is a view similar to FIG. 1 at the position in the downstroke when the liquid discharge has ceased and the air discharge continues as illustrated by an arrow.

A collar 56 covers the upper end of the second cylinder 10 and has a central opening 49 through which the upper portion 24 of the stem, the upper extension 40 of the first piston 41 and the upper section 48 of the second piston 45 extend, the collar having an integral vertical wall 51 secured peripherally to the upper end 2 of the second cylinder 10 and extending downwardly in such manner that an air entry channel 58 is formed therebetween. The air entry channel 58 and the groove 12 define an air entry port 53 which is open when the second piston 45 is fully raised in the rest position of FIG. 1 in which the outward extension 54 of the second piston 45 is aligned with the groove. The air entry port 53 is closed when the outward extension 54 engages the inner wall 47 of the second cylinder 10 when the second piston is moved downwards as shown in FIGS. 2, 3 and 4. When the air entry port 53 is open (as in FIG. 1) it provides communication between the air entry channel 58 and the air conduit 50. The wall 51 is integrally joined to a cup 63 of larger diameter and which is screw threaded for connection to the mouth of a container (not shown).

Each of the first and second pistons 41 and 45 are movable between respective raised and lowered positions. The upper ends 60 and 62 of the first piston 41 and the second piston 45 respectively are sealingly engageable with and disengageable from each other; when disengaged, these upper ends define an air exit port 55 communicating with the air conduit 50 which is open as shown in FIG. 3. When the upper ends 60 and 62 are engaged as shown in FIG. 1 the air exit port 55 is closed.

The stem 24,26 is movable between raised and lowered positions. An upper end 64 of the upper portion 24 of the stem and the upper end 60 of the upper extension 40 of the first piston 41 are sealingly engageable with and disengageable from each other; when disengaged as in FIG. 2, these upper ends 64 and 60 define an open liquid exit port 57 and when engaged as in FIG. 1 the liquid exit port is closed.

The lower portion 26 of the stem is hollow and open at its bottom end 29. The bottom end 29 of the lower portion 26 has a radially outwardly projecting rib 79 which makes sliding contact with the inner wall of the third cylinder 18 so that the lower portion 26 remains spaced from the third cylinder 18 by a small clearance. Biasing means in the form of the spring 36 extends within the lower portion 26 and the third cylinder 18 to bias the liquid entry port 31 into its closed position.

An actuator 65 is fitted onto the upper section 48 of the second piston 45 and defines an actuator chamber 67 communicating with the air exit port 55 and the liquid exit port 57. The actuator includes a side mounted nozzle insert 68 defining a fluid discharge orifice 69 communicating with the actuator chamber 67.

In use, the air purging pump dispenser 1 is connected by means of the threaded cup 63 to a suitable container (not shown) filled with a product. A dip tube 66 is connected to the central opening 20 of the third cylinder 18 and extends into the product. The first and second pistons 41 and 45 and the second cylinder 10 define an annular air chamber 59. The first piston 41, the stem 24,26 and the first cylinder 14 define an annular liquid chamber 61 which communicates with the liquid conduit 42.

In the rest position of FIG. 1 (and during normal operation after priming), air can flow freely into the air chamber 59, the liquid chamber 61 is filled with liquid, the liquid conduit 42 is also filled with liquid and the air exit port 55 and the liquid exit port 57 are closed. The pump dispenser 1 is actuated by a downstroke of the actuator 65 which forces the pistons 41 and 45 and stem 24,26 to travel downward, the air chamber 59 being then sealed off by closure of the air entry channel 58. Downward motion of the first piston 41 forces the upper portion 24 of the stem downward and in turn this forces the lower portion 26 downward. Sliding sealing contact is maintained between the lower end 29 of the lower portion 26 of the stem and frictional forces contribute to urging the lower portion into sealing engagement with the upper portion 24 of the stem so as to close the liquid inlet port 31. A volume of liquid is therefore trapped in the liquid chamber since both inlet port 31 and liquid exit port 57 are closed.

Figure 6:
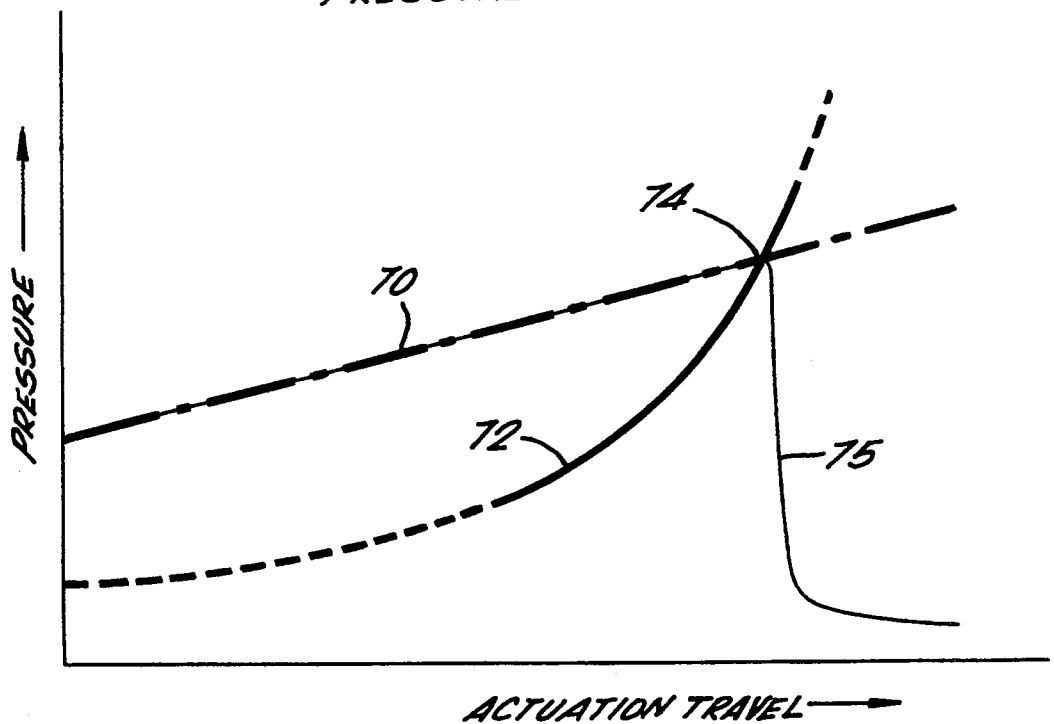
FIG. 6 is a diagram illustrating the changes in air and liquid pressures in the air and liquid chambers.

The pressures in both chambers 61 and 59 begin to rise as shown in FIG. 6. The pressure in liquid chamber 61 initially rises rapidly since liquid is incompressible and excess pressure in chamber 61 produces a downward force on the upper member 24 of the stem. Downward motion of the upper portion 24 of the stem relative to the first piston 41 is opposed by spring 36 and an equilibrium position is reached in which the liquid exit port 57 opens as shown in FIG. 2 to allow liquid to flow into the actuator chamber 67 and then be dispensed under pressure from fluid discharge orifice 69. The pressure in the liquid chamber 61 is shown in FIG. 6 at 70 and is determined by the force of the spring 36 and the cross-sectional dimensions of the stem 24,26.

Since air is compressible, the pressure in the air chamber 59, as shown at 72 in FIG. 6, increases gradually, rising inversely with the reduction in the volume of the air chamber. At some point during the downward stroke, the pressures in the two chambers 59 and 61 cross over as shown at 74 in FIG. 6 so that the pressure in the air chamber thereafter exceeds that in the liquid chamber. When the rib 79 at the lower end 29 of the lower portion 26 of the stem encounters the recess 78 the liquid pressure in liquid chamber 61 is released by escape of liquid via the recess and the pressure of liquid falls as indicated by curve 75 in FIG. 6. The position of the recess 78 relative to the third cylinder 18 (or the position of rib 79 relative to the lower portion 26) can be varied to provide a desired position during the downstroke at which crossover occurs.

Figure 7:
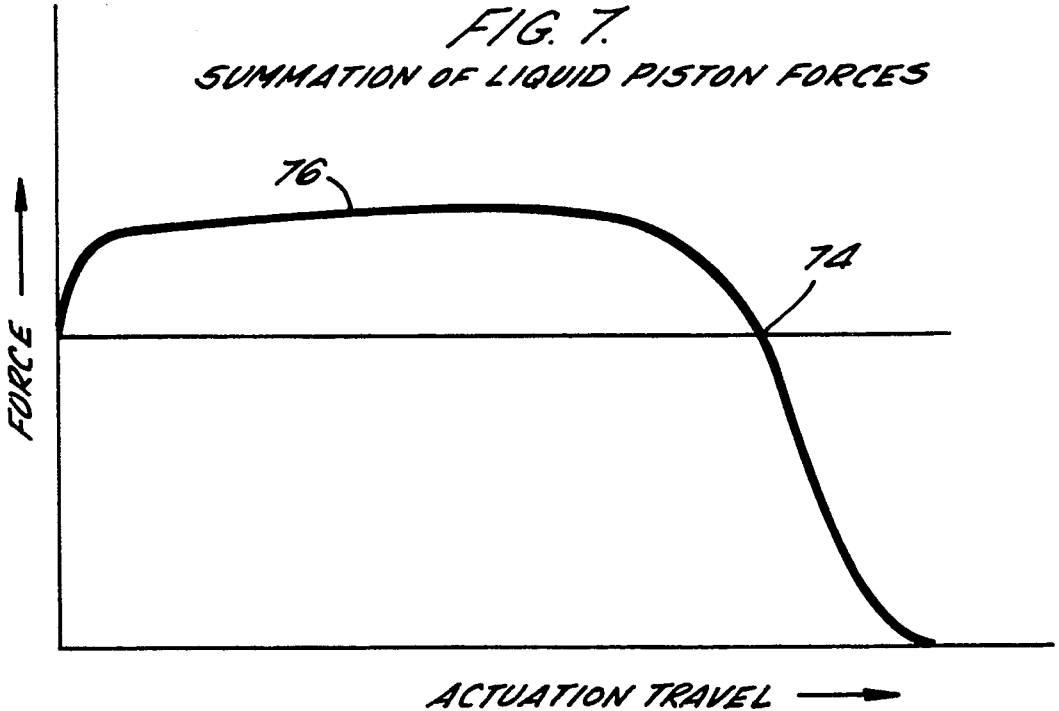
FIG. 7 is a diagram of the forces acting on the first piston during the down stroke.

The varying pressures in the two chambers create a summation of forces exerted against the first piston 41 as shown at 76 in FIG. 7. Prior to crossover, these forces on the first piston 41 are upwardly positive and cause the two pistons 41 and 45 to be tightly engaged, thus maintaining the air exit port 55 closed while the liquid exit port 57 is open and the pump dispenser sprays liquid. Beyond crossover, these forces on the first piston 41 are negative. The resulting downward motion of the first piston 41 relative to the second piston 45 causes the pistons 41 and 45 to disengage thereby opening the air exit port 55 and closing the liquid exit port 57 as shown in FIG. 3.

Air released under pressure from the air chamber 59 then flows through the air conduit 50, out of the air exit port 55, through the actuator chamber 67 and out of the fluid discharge orifice 69 as shown in FIG. 3. Liquid remaining in the actuator chamber 67 and discharge orifice 69 is purged from the actuator 65 by this flow of air.

At the end of the downstroke as shown in FIG. 4 the upward force provided by spring 36 moves the stem 24,26 and first piston 41 upwardly relative to the second piston 45 thereby closing both the liquid exit port 57 and the air exit port 55 as shown in FIG. 4.

Releasing the actuator 65 then allows the return stroke of the piston 1 under action of the spring 36. As the stem 24,26 moves upwardly the lower portion 26 of the stem separates slightly from the upper portion 24 due to frictional drag between the lower end 29 and the inner surface 9 of the third cylinder 18 thereby opening the liquid inlet port as shown in FIG. 1a. In this configuration the lower portion 26 of the stem is supported by contact between the uppermost turn 39 of spring 36 engaging the inwardly extending ring 32 (during the downstroke, the ring 32 moves out of contact with the uppermost turn 39 due to upward drag forces between the lower end 29 and the inner surface 9).

During the upstroke liquid enters the liquid chamber 61 through liquid entry port 31 and is drawn from the container via the dip tube 66. At the top of the upstroke the position of FIG. 1 is again reached in which air re-enters the air chamber 59 through the air conduit provided by groove 12.

The dispenser 1 is then ready for re-use. During extended periods between successive actuations of the dispenser 1, the tendency for liquid in contact with ambient air to evaporate leaving undesirable residues is minimised since the actuator chamber 67 and discharge orifice 69 are purged with a flow of air at the end of each actuation. The dispenser 1 is therefore ready for re-use without the need for cleansing the actuator to remove any residue. The dispenser 1 is therefore suitable for use with water based formulations, particularly those containing a high percentage of solids.

An alternative dispenser 100 shown in FIG. 8 is a modified version of the dispenser 1 of preceding Figures and will be described using corresponding references where appropriate for corresponding features.

The dispenser 100 is similar to the dispenser 1 of preceding Figures in that it includes first and second pistons 41 and 45 which are slidable in respective cylinders 14 and 10 in order to pressurise volumes of liquid and air respectively within chambers 61 and 59.

The dispenser 100 however has an air exit port 55 which is maintained permanently open by means of ribs 101 projecting outwardly of the upper end 60 of the first piston 41. The ribs 101 are circumferentially spaced about the upper end 60 so as to define therebetween air channels constituting the air exit port 55.

Unlike the dispenser 1 which includes a horizontally extending groove 12 formed in the second cylinder 10 to constitute an air conduit, the dispenser 100 has a second cylinder 10 having an upper end 2 which has the same internal cross-section as the remainder of the second cylinder such that in the rest position of the dispenser 1 in which the second piston is fully raised as shown in FIG. 8 the outward extension 54 of the second piston continues to make peripheral sealing contact with the inner wall 47 of the second cylinder.

In use, manual depression of the actuator 65 moves the second piston 45 downwardly thereby reducing the volume of air within the air chamber 59. The first piston 41 is driven downwardly by contact with the second piston 45 thereby reducing the volume of the liquid chamber 61. Air is expelled from the air chamber 59 through the air conduit 50, through the air exit port 55 into the actuator chamber 67. Liquid pressure within the liquid chamber 61 rapidly increases to a level at which excess pressure within the liquid conduit 42 exerts a downward force on the upper portion 24 of the stem sufficient to overcome the bias of spring 36 so that the liquid exit port 57 is opened.

Pressurised liquid is then forced out of the liquid chamber 61 via the liquid conduit 42, through the liquid exit port 57 into the actuator chamber 67 where it is turbulently mixed with the flow of air. The mixture of air and liquid then emerges from the fluid discharge orifice 69 as an atomised spray.

On completion of the downstroke the first and second pistons 41 and 45 travel in the reverse direction towards the rest position shown in FIG. 8. During reverse travel of the reverse piston 41 the liquid exit port 57 remains closed by action of spring 36 and the liquid entry port 31 is opened by slight separation between the upper and lower portions 24 and 26 of the stem so that liquid enters the liquid chamber 61.

During return travel of the second piston 45 the expansion of the air chamber 59 draws air into the air chamber via the air conduit 50 thereby creating suction within the actuator chamber 67. Any residual liquid remaining in the actuator chamber or in the vicinity of the nozzle insert 68 and discharge orifice 69 is sucked downwardly through the air conduit 50 into the air chamber 59. Any liquid collected in this manner will be at least partially entrained in the flow of air exiting the air chamber 59 during the next actuator of the dispenser 100.

Air suction created during the return stroke ensures that the actuator chamber 67 remains free of liquid between successive actuations thereby avoiding the build-up of residues caused by evaporation of the liquid which would otherwise lead to partial obstruction of the actuator or even total clogging.

The flow of air from the air chamber 59 also serves to purge the actuator chamber 67 of liquid at the final portion of travel during the downstroke when the lower end 29 of the stem lower portion 26 encounters the recess 78 in the third cylinder 18. A sudden drop in liquid pressure at this point results in the flow of liquid being shut off whereas the flow of air continues through the actuator 65 thereby providing a purging action.

In the dispenser 100 the liquid exit port 57 is defined between the upper end 60 of the first piston 41 and the upper end 64 of the stem upper portion 24 and the air exit port 55 is defined between the upper end 60 of the first piston and the upper end 62 of the second piston. Consequently the air and liquid exit ports 55 and 57 are necessarily in close proximity so that liquid/air mixing commences immediately when liquid exits the liquid exit port and also during the return stroke suction is applied in the vicinity of the liquid exit port thereby removing residual liquid from this region, A further alternative dispenser 120 is shown FIG. 9 and is described using corresponding reference numerals to those of preceding Figures where appropriate for corresponding features.

The dispenser 120 differs from the dispenser 100 of FIG. 8 in the configuration of the upper extension 40 of the first piston 41 and the upper section 48 of the second piston 45 and their relationship with the actuator 65.

In the dispenser 120 the upper extension 40 of first piston 41 extends upwardly beyond the upper end. 62 of the second piston 45 and is sealingly received in the actuator 65, The upper extension 40 defines a vertically extending liquid passageway 121 communicating with the liquid conduit 42 via the liquid exit port 57, In FIG. 9 the liquid exit port 57 is shown in its closed position corresponding to the rest position of the dispenser.

The upper section 40 of the first piston 41 is received as a snug fit within the upper section 48 of the second piston 45 so that in use there is no relative movement between the first and second pistons, The upper section 48 of the second piston 45 is provided with grooves facilitating air flow between the upper section 48 and the upper extension 40 so as to communicate between the air conduit 50 and the actuator chamber 67.

In use the liquid exit port 57 opens during the downstroke of the dispenser 120 allowing a flow of pressurised liquid to pass through the liquid passageway 121 into the actuator chamber 67 where it is mixed with air delivered under pressure from the air chamber 59 via the air conduit 50. The air and liquid mix in the actuator chamber 67 and are dispensed from the fluid discharge orifice 69 as an atomised spray. As illustrated in FIG. 11 the nozzle insert 68 is provided with swirl inducing grooves 122 extending non-radially from the periphery of the nozzle insert towards the centrally located fluid discharge orifice 69 so as to impart a swirling motion to the dispensed spray thereby assisting in the breakup of liquid droplets.

During the return stroke of the dispenser 120 the liquid exit port 57 remains closed and residual liquid in the region of the actuator chamber 67 is sucked back via the air conduit 50 into the air chamber 59. The build-up of deposits in the vicinity of the fluid discharge orifice and the actuator chamber 67 is avoided.

A further dispenser 130 is shown in FIGS. 12 and 13 and is described using corresponding reference numerals to those of preceding Figures where appropriate for corresponding elements.

In the dispenser 130 the upper section 48 of the second piston 45 is sealingly engaged in the actuator 65 such that the hollow interior of the upper section communicates with the actuator chamber 67. The upper section 48 is formed with a radially inwardly projecting shoulder 131 which is engaged by a co-operating shoulder 132 formed externally on the upper extension 40 of the first piston 41 to thereby limit penetration of the first piston within the second piston 45. In use there is no relative movement between the first and second pistons 41 and 45 and the upper end 60 of the first piston is provided with grooves to allow air to communicate between the air conduit 50 and the actuator chamber 67, the grooves thereby constituting a permanently open air exit port 55.

The air exit port 55 is thereby located in close proximity with the liquid exit port 57.

The actuator chamber 67 constitutes a vertically extending cylindrical volume in which air and liquid mix during the dispensing stroke. During the return stroke of the dispenser 130 any residual liquid in the region of the nozzle insert 68 and the orifice 69 is sucked back into the actuator chamber 67 and from there is drawn into the air conduit 50 to be collected in the air chamber 59.

In this arrangement the location of the air exit port 55 is at the lowermost point of the actuator chamber 67 in which air and liquid are mixed so that residual liquid is efficiently extracted by suction during the return stroke.

The air exit port 55 is also located in close proximity to the liquid exit port 57 so as to efficiently remove liquid from proximity with the liquid exit port during the return stroke.

A further alternative dispenser 160 is shown in FIG. 14 and is a modification of the dispenser 130 of FIGS. 12 and 13. In place of the nozzle insert 68 of apparatus 130 the apparatus 160 has a porous plug 161 co-operating with a wide bore outlet duct 162 to produce foam when air and liquid are dispensed from the actuator chamber 67.

The porous plug 161 is formed of wire mesh.

A further alternative dispenser 140 is shown FIGS. 15, 16 and 17 and will be described using corresponding reference numerals to those of preceding Figures where appropriate for corresponding elements.

The dispenser 140 includes first and second pistons 41 and 45 having the same configuration as those of the dispenser 120 of FIG. 9. The actuator 65 is however modified such that the upper extension 40 of the first piston 41 has an upwardly extending liquid passageway 121 communicating with a horizontally extending duct 141 defined by the actuator 65 and which is isolated from the flow of air into the actuator from the air conduit 50.

The horizontal duct 141 communicates with a peripheral channel 142 defined by the nozzle insert 68 and communicating with swirl grooves 122 which in use allow liquid to flow from the peripheral channel through the grooves to a centrally positioned fluid discharge orifice 69 from which liquid is dispensed.

The actuator 65 further defines a horizontally extending air duct 143 which is in line with the fluid discharge orifice 69 and communicates with the air conduit 50 such that in use a flow of air exits the orifice 69 by flowing directly through the air duct 143. Mixing of air and liquid takes place locally at the fluid discharge orifice 69.

A further alternative dispenser 150 is shown in FIG. 18 and is described using corresponding reference numerals to those of previous Figures for corresponding elements where appropriate.

The dispenser 150 is similar to the dispenser 140 of FIG. 15 but has a modified upper extension 40 to the first piston 41 in that it is shorter in length so as to project to a lesser extent into the actuator 65. The upper extension 40 defines a liquid passageway 121 which communicates with an actuator chamber 67 which in turn communicates with a horizontally extending duct 151 which is in line with and communicates with the fluid discharge orifice 69.

The air conduit 50 extends peripherally of the upper extension 40 and is isolated from the actuator chamber 67. The air conduit 50 communicates instead with a peripheral channel 152 extending peripherally of the nozzle insert 68 and communicating with swirl grooves 122 delivering air from the air conduit 50 to the fluid discharge orifice 69. Mixing of air and liquid in use occurs locally at the orifice 69.

In the above embodiments the actuating means is constituted by an actuator 65 of the button type which is manually depressed by finger pressure. Alternative embodiments may include a trigger mechanism in which movement of a trigger is coupled to movement of the pistons 41 and 45 by lever action to provide mechanical advantage or for convenience.

I claim:

1. Dispensing apparatus for dispensing liquid by pump action as an atomized spray, the apparatus comprising a body defining a first cylinder within which a first piston is reciprocatably located to define a first chamber of variable volume and which in use contains a quantity of liquid to be dispensed;

the body further defining a second cylinder within which a second piston is reciprocatably located to define a second chamber of variable volume and which in use contains a quantity of air;

actuating means operable during an actuating stroke to move the respective pistons in tandem in a direction such that the volumes of the respective chambers are reduced and during a return stroke to return the pistons to respective rest positions in which the respective chambers are expanded;

liquid valve means operable to admit liquid to the first chamber during at least part of the return stroke and release pressurized liquid therefrom during at least part of the actuating stroke, the liquid valve means including a liquid exit port for the release of liquid from the first chamber;

channel means defining a discharge orifice and a dispensing channel communicating between the liquid exit port and the discharge orifice; and air conduit means defining an air conduit communicating between the second chamber and the dispensing channel during at least part of the actuating stroke, whereby in use, air pressurized in the second chamber is conducted via the channel through the discharge orifice, wherein the liquid valve means is operable to close the liquid exit port before completion of the actuating stroke such that during a terminal part of the actuating stroke, the release of liquid from the first chamber is arrested.

2. Dispensing apparatus as claimed in claim 1 wherein the liquid valve means is opened in response to an increase in pressure of liquid within the first chamber, the apparatus further comprising pressure relief means operable to reduce the liquid pressure within the first chamber during the terminal part of the actuating stroke to thereby effect closure of the liquid valve means.

3. Dispensing apparatus as claimed in claim 2 wherein the liquid valve means comprise an elongate stem having an upper portion which is movable into and out of engagement with the first piston to close and open the liquid exit port respectively and a lower portion which extends through the first cylinder and includes a lower end which is peripherally engageable with an internal surface of the body thereby normally closing the first chamber, the surface being provided with a recess to allow liquid to by-pass the lower end during the terminal part of the actuating stroke to thereby reduce liquid pressure and close the liquid valve means.

4. Dispensing apparatus as claimed in claim 1 further comprising air valve means operable to release air compressed within the second chamber and comprising an air exit port communicating with the dispensing channel, the air valve means being operable such that the air exit port is open during at least part of the actuating stroke and closed during the return stroke.

5. Dispensing apparatus as claimed in claim 4 wherein the air valve means and the liquid valve means are co-operable such that on commencement of the terminal part of the actuating stroke the liquid exit port closes and the air exit port opens.

6. Dispensing apparatus as claimed in claim 5 wherein the air valve comprises engageable portions of the first and second pistons respectively which are relatively movable to open and close the air exit port.

7. Dispensing apparatus as claimed in claim 6 wherein the air exit port is defined between an annular upper end portion of the first piston and an internal wall of the second piston, the liquid exit port being defined between the annular upper end portion of the first piston and an upper end portion of the liquid valve means whereby the air exit port is located immediately adjacent the liquid exit port.

8. Dispensing apparatus as claimed in claim 4 comprising an air entry port communicating with the second chamber and which is open at the end of the return stroke to admit air into the second chamber.

9. Dispensing apparatus for dispensing liquid by pump action as an atomized spray, the apparatus comprising a body defining a first cylinder within which a first piston is reciprocatably located to define a first chamber of variable volume and which in use contains a quantity of liquid to be dispensed:

the body further defining a second cylinder within which a second piston is reciprocatably located to define a second chamber of variable volume and which in use contains a quantity of air;

actuating means operable during an actuating stroke to move the respective pistons in tandem in a direction such that the volumes of the respective chambers are reduced and during a return stroke to return the pistons to respective rest positions in which the respective chambers are expanded;

liquid valve means operable to admit liquid to the first chamber during at least part of the return stroke and release pressurized liquid therefrom during at least part of the actuating stroke, the liquid valve means including a liquid exit port for the release of liquid from the first chamber;

channel means defining a discharge orifice and a dispensing channel communicating between the liquid exit port and the discharge orifice; and air conduit means defining an air conduit communicating between the second chamber and the dispensing channel during at least part of the actuating stroke, whereby in use, air pressurized in the second chamber is conducted via the channel through the discharge orifice, wherein the air conduit is continuously in communication with the dispensing channel via an air exit port which remains continuously open.

10. Dispensing apparatus as claimed in claim 9 wherein the air exit port is defined between an annular upper end of the first piston and an internal wall of the second piston, the liquid exit port being defined between the annular upper end portion of the first piston and an upper end portion of the liquid valve means whereby the air exit port is located immediately adjacent the liquid exit port.

11. Dispensing apparatus as claimed in claim 9 wherein the channel means defines a mixing chamber located downstream of both the air exit port and the liquid emit port, the mixing chamber being upstream of the discharge orifice whereby air and liquid are mixed prior to discharge.

12. Dispensing apparatus as claimed in claim 9 wherein the channel means comprises an air channel and a liquid channel formed separately from the air channel, the air channel and the liquid channel extending from their respective air and liquid exit ports to a location immediately adjacent the discharge orifice at which they are joined so as to provide mixing of air and liquid immediately prior to discharge.

13. Dispensing apparatus as claimed in claim 12 wherein at least a terminal portion of the liquid channel extends linearly in line with the discharge orifice.

14. Dispensing apparatus as claimed in claim 9 wherein the channel means comprises an actuator button co-operating with the pistons to define the dispensing channel, the actuator button being manually displaceable to move the first and second pistons relative to the body during the actuating stroke.

15. A method of dispensing a liquid by pump action of a dispensing apparatus, the method comprising the steps of pressurizing a quantity of the liquid in a first chamber by movement of a first piston to reduce the volume of the first chamber during an actuating stroke of the apparatus, pressurizing a quantity of air in a second chamber by movement of a second piston in tandem with the first piston during the actuating stroke, releasing pressurized liquid from the first chamber into a dispensing channel by operation of a liquid valve means such that liquid flows through the dispensing channel and is dispensed from a discharge orifice, releasing pressurized air from the second chamber into the dispensing channel during at least part of the actuating stroke, wherein the liquid valve means is closed during a terminal part of the actuating stroke, and releasing air from the second chamber during the terminal part of the actuating stroke to thereby purge the dispensing channel of liquid.

16. A method as claimed in claim 15 including the step of releasing both air and liquid during at least part of the actuating stroke and allowing the air and liquid to mix prior to being dispensed from the discharge orifice.

17. A method of dispensing a liquid by pump action of a dispensing apparatus, the method comprising the steps of pressurizing a quantity of the liquid in a first chamber by movement of a first piston to reduce the volume of the first chamber during an actuating stroke of the apparatus, pressurizing a quantity of air in a second chamber by movement of a second piston in tandem with the first piston during the actuating stroke, releasing pressurized liquid from the first chamber into a dispensing channel by operation of a liquid valve means such that liquid flows through the dispensing channel and is dispensed from a discharge orifice, releasing pressurized air from the second chamber into the dispensing channel during at least part of the actuating stroke, and allowing air to enter the second chamber via the dispensing channel during a return stroke of the apparatus in which the volume of the first and second chambers are increased such that residual liquid in the dispensing channel is sucked into the second chamber.

18. An air purge pump, comprising:

a first cylinder having open upper and lower ends;

a second cylinder having a diameter greater than that of the first cylinder and having open upper and lower ends, the lower end of the second cylinder merging with the upper end of the first cylinder, an inner surface of the second cylinder adjacent the upper end of the second cylinder having an air conduit;

a third cylinder having a diameter smaller than that of the first cylinder and having an open upper end and a lower end which is closed except for a central opening, the lower end of the first cylinder merging with the upper end of the third cylinder;

an elongated stem having an upper portion which extends upwardly through the upper end of the second cylinder and having a lower portion which extends downwardly through the first and second cylinders with a lower end which is peripherally engageable with an inner surface of the third cylinder;

a first piston having an upper hollow extension with an open upper end, the upper portion of the elongated stem extending within and being spaced from the upper extension, thus defining a liquid conduit therebetween, the first piston having a lower extension extending downwardly through the second cylinder into the first cylinder with a lower end which is peripherally engageable with an inner surface of the first cylinder; and a second piston having a hollow upper section, the upper extension of the first piston extending within and being spaced from the upper section of the second piston, thus defining an air conduit therebetween, the second piston having a lower section with an outward extension which is peripherally engageable with an inner wall of the second cylinder.

19. The air purge pump as claimed in claim 18, wherein the third cylinder defines a recess in its inner wall, the recess being disposed at any selected position below the upper end and above the lower end of the third cylinder.

20. The air purge pump as claimed in claim 18, wherein the air conduit is a first groove disposed in the inner surface of the second cylinder.

21. The air purge pump as claimed in claim 20, further including a collar covering the upper end of the second cylinder and having a central opening through which the upper portion of the elongated stem, the upper extension of the first piston and the upper section of the second piston extend, the collar having an integral wall secured to an outer periphery of the upper end of the second cylinder and extending downwardly such that an air entry channel is formed therebetween, the air entry channel and the first groove defining an air entry port which is open when an outer periphery of a lower end of the lower section of the second piston is aligned with said groove and which is closed when this outer periphery engages the inner wall of the second cylinder, the air entry port, when open, interconnecting the air conduit with the air channel.

22. The air purge pump as claimed in claim 18, wherein each of the first and second pistons are movable between raised and lowered positions, the first piston and the second piston being engageable with and disengageable from each other, the first and second pistons when disengaged defining an open air exit port, and when engaged defining a closed air exit port.

23. The air purge pump as claimed in claim 22, wherein the upper end of the upper extension of the first piston and an upper end of the upper section of the second piston are engageable with and disengageable from each other, the air exit port being closed when these upper ends are engaged and being open when these ends are disengaged.

24. The air purge pump as claimed in claim 18, wherein the stem is movable between raised and lowered positions, the stem and first piston being engageable with and disengageable from each other, the stem and first piston when disengaged defining an open liquid exit port and when engaged defining a closed liquid exit port.

25. The air purge pump as claimed in claim 24, further including means for forming a liquid entry port, including the lower portion of the stem.

26. The air purge pump as claimed in claim 25, wherein the means for forming the liquid entry port integrally secures the upper and lower portions of the stem together such that an upper end of the lower portion of the stem and a lower end of the upper portion of the stem can be sealed together to close the liquid entry port and can be moved away from each other to define a liquid channel therebetween, thereby opening the liquid entry port.

27. The air purge pump as claimed in claim 26 wherein the lower portion of the stem is hollow and open at its bottom end, the air purge pump further including biasing means extending within the lower portion of the stem and the third cylinder to bias the liquid entry port into a closed position.

28. The air purge pump as claimed in claim 24, wherein an upper end of the upper portion of the stem and the upper end of the upper extension of the first piston are engageable with and disengageable from each other, the liquid exit port being closed when these upper ends are engaged and being open when these upper ends are disengaged.

* * * * *